(12) United States Patent
Tadokoro et al.

(10) Patent No.: US 6,424,508 B1
(45) Date of Patent: Jul. 23, 2002

(54) MAGNETIC TUNNEL JUNCTION MAGNETORESISTIVE HEAD

(75) Inventors: Shigeru Tadokoro; Izuru Ishii, both of Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/383,201

(22) Filed: Aug. 26, 1999

(30) Foreign Application Priority Data

Oct. 8, 1998 (JP) .......................................... 10-286289

(51) Int. Cl.[7] .................................................. G11B 5/39
(52) U.S. Cl. ..................................... 360/324.2; 360/314
(58) Field of Search .............................. 360/324.2, 324, 360/324.1, 324.11, 324.12, 314, 315, 318.1, 316, 126; 428/332, 336, 692; 324/252; 29/603.08, 603.07, 603.13, 603.14

(56) References Cited

U.S. PATENT DOCUMENTS

| | | | | |
|---|---|---|---|---|
| 5,390,061 A | * | 2/1995 | Nakatani et al. | 360/324.1 |
| 5,636,093 A | * | 6/1997 | Gijs et al. | 360/126 |
| 5,726,837 A | * | 3/1998 | Nakatani et al. | 360/324.2 |
| 5,729,410 A | * | 3/1998 | Fontana, Jr. et al. | 360/324.2 |
| 5,859,753 A | * | 1/1999 | Ohtsuka et al. | 360/324.1 |
| 5,966,012 A | * | 10/1999 | Parkin | 324/252 |
| 5,986,858 A | * | 11/1999 | Sato et al. | 360/324.2 |
| 6,011,674 A | * | 1/2000 | Nakatani et al. | 360/324.2 |
| 6,061,210 A | * | 5/2000 | Gill | 360/324.12 |
| 6,072,382 A | * | 6/2000 | Daughton et al. | 338/82 R |
| 6,078,484 A | * | 6/2000 | Sakakima | 360/324 |
| 6,097,579 A | * | 8/2000 | Gill | 360/324.2 |
| 6,124,711 A | * | 9/2000 | Tanaka et al. | 324/252 |
| 6,127,045 A | * | 10/2000 | Gill | 428/611 |
| 6,178,074 B1 | * | 1/2001 | Gill | 360/324.2 |
| 6,185,079 B1 | * | 2/2001 | Gill | 360/324.2 |
| 6,295,718 B1 | * | 10/2001 | Li et al. | 29/603.08 |

FOREIGN PATENT DOCUMENTS

| | | | |
|---|---|---|---|
| JP | 9-251618 | | 9/1997 |
| JP | 10-162327 | | 6/1998 |
| JP | 2000113421 | * | 4/2000 |

* cited by examiner

*Primary Examiner*—Brian E. Miller
*Assistant Examiner*—Tianjie Chen
(74) *Attorney, Agent, or Firm*—Mattingly, Stanger & Malur, P.C.

(57) ABSTRACT

A tunnel junction MR head can be easily manufactured and arranged as follow. A first tunnel junction is formed by a magnetization free layer, a first magnetization pinned layer and a thin insulated layer formed between the both layers. A second tunnel junction is formed by the magnetization free layer, a second magnetization pinned layer and an insulated layer. The first and second tunnel junctions are connected to both ends of the magnetization free layer through the magnetization free layer. A detection current flowing from a first electrode connected to the first tunnel junction is passed to a second electrode through the first tunnel junction, the magnetization free layer and the second tunnel junction.

15 Claims, 5 Drawing Sheets

A-A' SECTIONAL VIEW

FIG. 1A

PLAN VIEW

FIG. 1B

A-A' SECTIONAL VIEW

FIG. 1C

B-B' SECTIONAL VIEW

PLAN VIEW

FIG. 7B

A-A' SECTIONAL VIEW

FIG. 7C

B-B' SECTIONAL VIEW

MAGNETIC TUNNEL JUNCTION MAGNETORESISTIVE HEAD

BACKGROUND OF THE INVENTION

1. Field of the Invention

The present invention relates to a magnetic head used in a magnetic disk device, a magnetic tape device and so forth, and more particularly, to a magnetic tunnel junction magnetoresistive head (MR head) having a high sensitivity.

2. Description of the Prior Art

A magnetic information recording device such as a magnetic disk device, a magnetic tape device and so forth has been always required to record information at a higher density. Since a higher recording density causes reduction of a reproduced signal of a magnetic head, it is essential to develop more practical magnetic head in order to improve a recording density.

Predominant one of current high-density magnetic recording magnetic heads is a so-called composite magnetic head corresponding to a composition of a read magnetic head and a write magnetic head. In order to improve a reproducing sensitivity, there has been used as a read head an MR head based on a magnetoresistive effect or a giant magnetoresistive (GMR) head based on a GMR effect which has a higher sensitivity.

The change rates of the electric resistance caused by the magnetoresistive (MR) and giant magnetoresistive (GMR) field used in a prior art magnetic head are about 2–3% and about 5–10%, respectively. The larger the change rate of the electric resistance is the higher the reproduced output of the magnetic head is. Therefore, there has been demanded a magnetoresistive material having a higher change rate of the electric resistance. As one of materials potentially providing a higher change rate of the electric resistance, there is a material having a tunnel junction magnetoresistive effect (which will be referred to as a tunnel junction MR, hereinafter).

The tunnel junction MR is a phenomenon in which an electric resistance in a tunnel junction between two stacked ferromagnetic layers with an insulated layer disposed therebetween varies with the angle formed by the magnetization directions of the respective ferromagnetic layers. That is, the tunnel junction MR material has the maximum electric resistance when the magnetization directions of the both layers are oriented parallel to each other but in opposite directions, and has the minimum electric resistance when the magnetization directions are oriented parallel to each other. Accordingly, if one of the magnetization directions of the ferromagnetic layers is pinned or fixed while the other is rotated according to an external magnetic field, the electric resistance of the tunnel junction MR material is correspondingly changed. This effect is highly similar to that of a GMR spin valve film. However, the current must be passed parallel to the ferromagnetic layers in the spin valve film, whereas the current must be passed through the tunnel junction (in a direction perpendicular to the junction) in the tunnel MR material. In the spin valve film, even when the current is passed through the ferromagnetic layers in a direction perpendicular to the interface therebetween, the electric resistance becomes very small and the change in the electric resistance becomes small, because the intermediate layer is electrically conductive. On the other hand, in the tunnel junction MR material, the change in the electric resistance is much larger than that of the spin valve film, because the intermediate layer is a thin insulated layer. In order to put the tunnel junction MR material in practical use, the electric resistance of the tunnel junction MR material should be small enough to have the order of 10 to $10^2$ ohms. Since the tunnel junction resistance is abruptly increased when the thickness of the insulated layer provided between the magnetic layers increases, it is demanded in the tunnel junction MR material that the insulated layer is very thin and has a high insulating property. In the original tunnel junction MR material, the stable formation of its element was very difficult, because it was difficult to form the insulated layer. However, recent studies have found that a good insulated layer of aluminum oxide can be formed, so that there can be formed a tunnel junction MR film, which has the change rate of about 20% at room temperature, with a good reproducibility.

In JP-A-10-162327, a magnetoresistive head which uses a magnetic tunnel junction and linearly responds to a magnetic field from a magnetic medium is disclosed.

Hereinafter, in connection with aforementioned explanation, a ferromagnetic layer, which has the fixed magnetization direction, of ferromagnetic layers forming the tunnel junction of the tunnel junction MR is called "a magnetization pinned layer", and the other having the freely rotatable magnetization direction is called "a magnetization free layer".

In a prior art MR (GMR) head of a most general structure, current is passed from one of electrodes formed in an identical plane to the other electrode through an MR (GMR) layer. On the other hand, in a tunnel junction MR head, unlike the prior art MR or GMR head, current must be passed through the tunnel junction in a direction perpendicular thereto. To this end, one electrode must be disposed below the tunnel junction made up of the magnetization pinned layer, an insulated layer and the magnetization free layer to pass a detection current between one electrode and the other electrode connected to an upper part of the tunnel junction. It is also required to provide layers for applying a bias magnetic field, which directs the magnetization of the magnetization free layer uniformly in a desirable direction and is for linearly responding to a magnetic field from a medium, at both ends of the magnetization free layer. In this connection, however, these layers must be isolated from the electrodes, the magnetization pinned layer and the magnetization free layer. In this way, the tunnel junction MR head of the structure wherein any of the electrodes, the magnetization pinned layer and the magnetization free layer are not in the same plane, is largely different in structure from the prior art MR (GMR) head. Therefore it is difficult to manufacture the tunnel junction MR head with use of a process of manufacturing the prior art MR head.

SUMMARY OF THE INVENTION

It is therefore a first object of the present invention to provide a tunnel junction MR head of a structure similar to that of the prior art head, which can be easily manufactured with use of the manufacturing process of the prior art head.

A magnetic head is manufactured by machiningly cutting magnetic heads formed on a substrate into individual separate heads and by polishing a surface of each head opposed to a medium. In an ordinary MR head structure, a part of an MR layer is exposed to an air bearing surface and is mechanically cut and polished simultaneously with the substrate at the time of the machining and polishing. In the tunnel junction MR head, the thickness of an insulated layer between a magnetization free layer and a magnetization pinned layer is as very small as 20 angstroms or less. In this way, since two ferromagnetic layers are provided adjacent to each other via the thin insulated layer therebetween, the electrical short-circuiting takes place easily between the two ferromagnetic layers in the cutting or polishing step. This problem results from the structural fact that the two ferromagnetic layers arranged as spaced by a very small interval therebetween are both exposed to the air bearing surface.

A second object of the present invention is to provide a tunnel junction MR head which can prevent the electrical short-circuiting between such ferromagnetic layers and can have a high reliability.

In order to attain the first object of the present invention, first and second tunnel junctions are formed at both ends of a magnetization free layer. The word "the end of the magnetization free layer" as used herein means two regions of the magnetization free layer in a track direction separated by its central line and provided at both sides of the central line. The first tunnel junction is defined by one end of the magnetization free layer, a first magnetization pinned layer and a thin insulated layer formed therebetween. The second tunnel junction at the other end of the magnetization free layer is defined by the magnetization free layer, a second magnetization pinned layer and the insulated layer. The first tunnel junction is contacted with the first magnetization pinned layer and connected to a first electrode. The second tunnel junction is contacted with the second magnetization pinned layer and connected to a second electrode. The first and second tunnel junctions are connected each other through the magnetization free layer, so that a detection current flowing from the first electrode is passed to the magnetization free layer through the first tunnel junction and then passed to the second electrode through the second tunnel junction.

In order to attain the second object of the present invention, the sides of the magnetization free layer on its magnetic medium side are projected toward the magnetic medium side from a straight line obtained by connecting the ends of the first and second magnetization pinned layers on the magnetization free layer side. With this structure, the magnetization pinned layers are provided inside the air bearing surface of the magnetic head and are not exposed to the air bearing surface.

DESCRIPTION OF THE PREFERRED EMBODIMENTS

Prior to explanation of the present invention, explanation will be first made as to the structure of the prior art MR (GMR) head and how to manufacture the head, for comparison between the structure of the prior art MR head and the structure of a tunnel junction MR head of the present invention.

Figure 3:
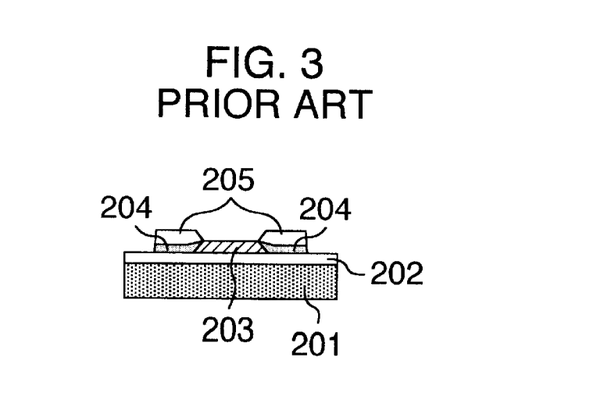
FIG. 3 shows a structure of a prior art MR head.

FIG. 3 shows a cross-sectional view of a structure of a general MR head. This figure is a cross-sectional view of a surface of the head opposed to a magnetic medium. Reference numeral 201 denotes a lower magnetic shield, and reference numeral 202 denotes an insulated layer for isolating the magnetic shield from an element part. Reference numeral 203 denotes an MR layer. The MR layer is usually made up of a plurality of ferromagnetic layers and nonmagnetic layers, but explanation thereof is omitted herein. The MR layer 203 is etched at both ends of a track width, and bias layers 204 and electrodes 205 are formed thereat. The bias layers 204 are used in order that the MR layer 203 linearly responds to a medium magnetic field by applying a magnetic field to the MR layer 203 from the lateral direction to provide uniform magnetization for the MR layer 203. A permanent magnet film or ferromagnetic/anti-ferromagnetic laminated film is used as the bias layer 204. The bias layers 204 and the electrodes 205 are formed at the both ends of the MR layer 203, and current is passed from one electrode to the other to detect a change in the electric resistance. Further, an insulated layer and an upper magnetic shield are provided above the bias layers and electrodes, but the explanation thereon will be omitted.

Figure 4:
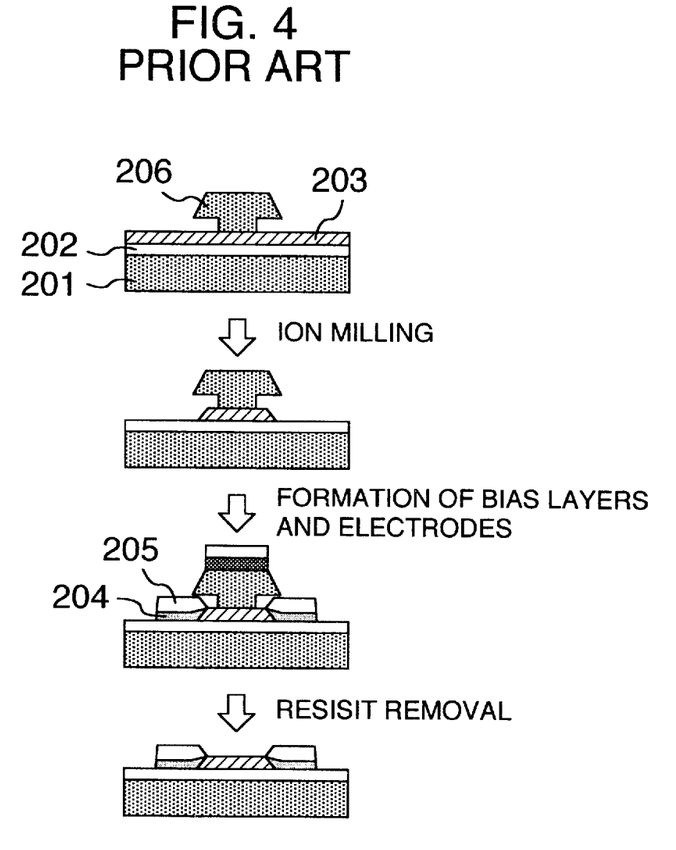
FIG. 4 shows how to manufacture the prior art MR head.

FIG. 4 shows how to manufacture the element part of the prior art MR head of FIG. 3. The lower magnetic shield 201, the lower insulated layer 202 and the MR layer 203 are formed in turn, and then a resist film 206 having a shape shown in the drawing is formed on the MR layer 203 by means of 2-layer resist. The resist has a so-called mushroom shape having its upper part larger than its lower part. When the MR layer 203 is etched by ion milling with use of the resist as a mask, only a part of the MR layer 203 under the resist film 206 remains and the other part is etched, thus resulting in that the MR layer 203 has such a configuration as illustrated. Without the resist film 206 removed, a permanent magnetic film as the bias layers 204 and the electrodes 205 are formed. After the resist film 206 is removed, an MR element part is fabricated. The resist is mushroom-shaped so as to remove the resist easily during this step. If the upper part of the resist is set to have the same size as the lower part thereof, then it becomes difficult to release the resist, because the electrodes 205 are covered with the resist. Thereafter, the upper insulating layer and the upper magnetic shield are formed, which step will be omitted. In this connection, as already explained above, the method for manufacturing the prior art MR head is featured in that a pair of electrodes in an identical plane can be collectively formed with use of the resist film 206.

Figure 2:
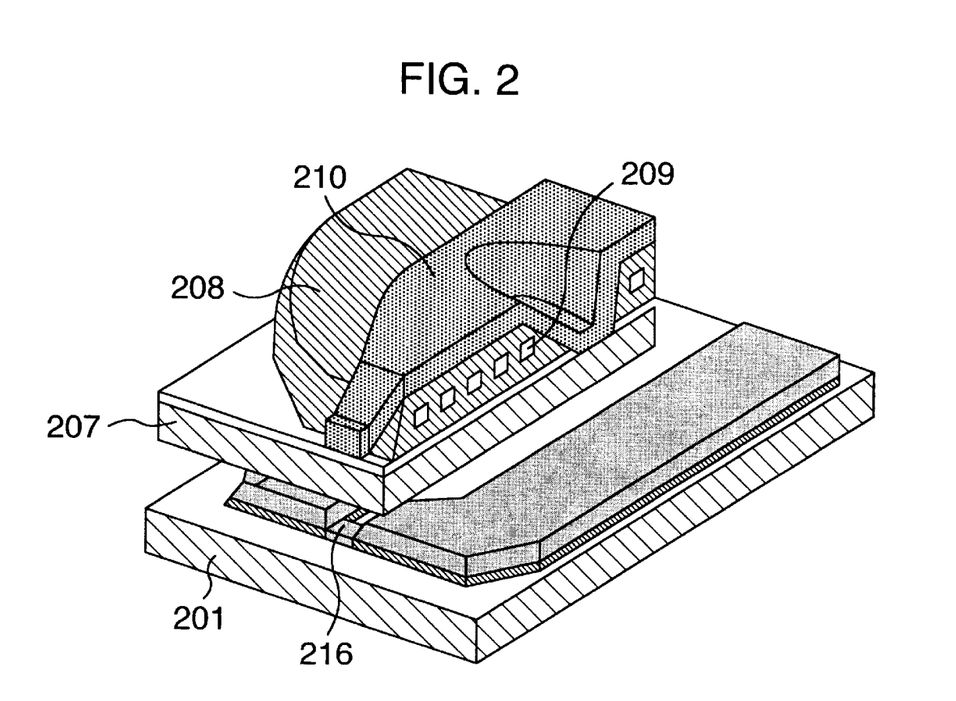
FIG. 2 shows a structure of a composite magnetic head comprising of a read head and a write head.

FIG. 2 shows a structure of a composite magnetic head corresponding to a combination of the tunnel junction MR head 216 of the present invention and a write head. The tunnel junction MR head 216 as a read head is disposed between an upper magnetic shield 207 and the lower magnetic shield 201. The magnetic shields are used to detect a magnetic signal from the magnetic medium with a high resolution, and a spacing between the magnetic shields corresponds nearly to the record wavelength of the magnetic signal on the magnetic medium. The write head is provided above the upper magnetic shield 207. The write head includes a magnetic core 210, a coil 209 formed so as to insert in the magnetic core 210, and an insulating film 208 for insulating the coil. For convenience of easy understanding of the drawing, FIG. 2 is drawn as the cross sectional view in which the upper magnetic shield film 207, the magnetic core 210 and the coil 209 are partly omitted. In its actual head, however, the upper magnetic shield film 207, the magnetic core 210 and the coil 209 are formed substantially symmetrically with respect to left and right. The tunnel junction MR head 206 of the present invention is used as the read head, and the write head manufactured by the prior art technique may be used as its write head.

Explanation will next be made as to the detailed structure of the tunnel junction MR head.

Figure 1A:
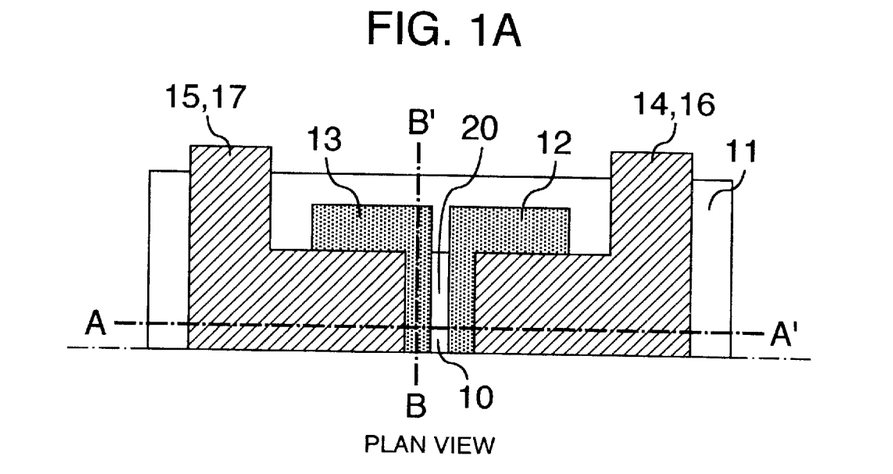
FIG. 1A is a plan view showing a structure of a first preferred tunnel junction MR head in accordance with the present invention.
Figure 1B:
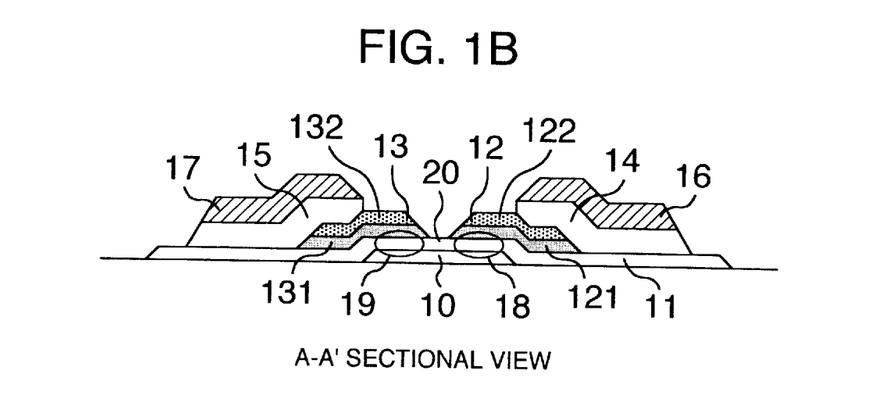
FIG. 1B is a cross-sectional view taken along line A–A' in FIG. 1A.
Figure 1C:
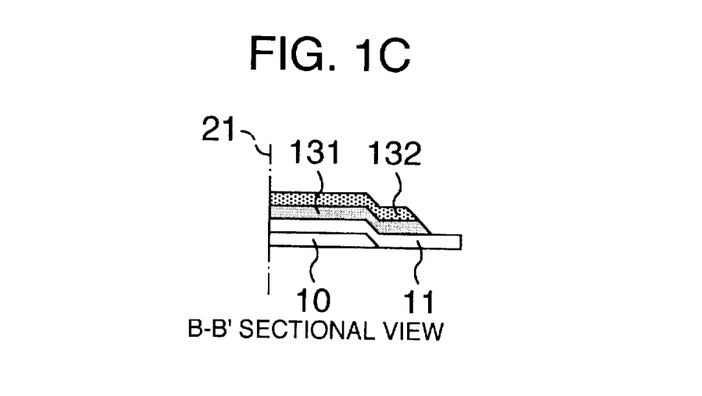
FIG. 1C is a cross-sectional view taken along line B–B' in FIG. 1A.

FIG. 1 shows, in plan view, a preferred structure of the tunnel junction MR head having a magnetization free layer provided below a magnetization pinned layer. The plan view is a diagram viewed from a substrate surface side of the head of the present invention, depicting only major parts of the present invention. The major parts are inserted into between the upper and low magnetic shields together with a gap insulating layer, etc. An A–A' sectional view in the drawing shows a cross sectional view taken along a chain-dotted line A–A' in the plan view. Further, a B–B' sectional view in the drawing shows a cross sectional view taken along a chain-dotted line B–B' in the plan view. Explanation will be made as to the structure of the magnetic head of the present invention in connection with the A–A' sectional view in the drawing. In the drawing, reference numeral 10 denotes a magnetization free layer, 11 denotes an insulated layer forming a tunnel junction, and 12 denotes a first magnetization pinned layer. In this example, the magnetization pinned layer is made up of a ferromagnetic layer 121 and an anti-ferromagnetic layer 122, and the magnetization direction of the ferromagnetic layer 121 is fixed to a specific direction by the anti-ferromagnetic layer 122. Reference numeral 13 denotes a second magnetization pinned layer which is made up of a ferromagnetic layer 131 and an anti-ferromagnetic layer 132 in the same way as the first magnetization pinned layer 12. The magnetization of the second magnetization pinned layer 13 is fixed to the same direction as the magnetization direction of the first magnetization pinned layer 12. Reference numerals 14 and 15 denote permanent magnetic films for applying a bias magnetic field to the magnetization free layer 10, 16 denotes a first electrode film, and 17 denotes a second electrode film. The magnetization pinned layers 12, 13 defines a gap 20 on the insulated layer 11. An end of the magnetization free layer 10 and the first magnetization pinned layer 12 are insulated from each other by the insulated layer 11 to form a first tunnel junction 18. The electric resistance of the first tunnel junction 18 varies with an angle made by the magnetization directions of the magnetization free layer 10 and first magnetization pinned layer 12. That is, when the magnetization directions of the first magnetization pinned layer 12 and magnetization free layer 10 are oriented parallel to each other, the electric resistance of the first magnetization pinned layer 12 becomes minimum. Whereas, when the magnetization directions of the magnetization free layer 10 and first magnetization pinned layer 12 are oriented parallel to each other but in opposite directions, the electric resistance of the first tunnel junction 18 becomes maximum. When the angle made by the magnetization directions of the both layers is between the minimum and the maximum, the electric resistance is a sine function of the magnetization angle. The electric resistance change of the tunnel junction holds true also for a tunnel junction 19 defined by the magnetization free layer 10, the second magnetization pinned layer 13 and the insulated layer 11. That is, when the magnetization directions of the magnetization free layer 10 and the second magnetization pinned layer 13 are oriented parallel to each other, the electric resistance of the tunnel junction 19 becomes small. Whereas, when the magnetization directions of the magnetization free layer 10 and the second magnetization pinned layer 13 are oriented parallel to each other but in opposite directions, the electric resistance of the tunnel junction 19 becomes large. A detection current flowing from the first electrode film 16 adjacent to the first magnetization pinned layer 12 and connected to the first tunnel junction 18 is passed through the first tunnel junction 18 to flow into the magnetization free layer 10. Further, the detection current is passed through the second tunnel junction 19 to flow into the second electrode film 17 connected to the second tunnel junction 19. The magnetization of the magnetization free layer 10 is pointed substantially to a horizontal direction of the drawing in the absence of an external magnetic field. The magnetization of the first and second magnetization pinned layers 12, 13 are fixed so as to be substantially perpendicular to the magnetization of the magnetization free layer 10 in the absence of the external magnetic field. The magnetization directions of the first and second magnetization pinned layers 12, 13 are the same. The setting of such magnetization directions is due to the reasons that its sensitivity becomes highest under the above conditions and sensitivities for positive and negative magnetic fields are set equal to minimize the unbalance in the reproduced waveform of the head. In the illustrated example, the magnetization directions of the first and second magnetization pinned layers 12, 13 are fixed to the specific direction by the anti-ferromagnetic layers 122, 132. This method is the same known technique as the prior art GMR head and so forth, and the anti-ferromagnetic layer usable in the GMR head can be basically applied even to the present invention. The magnetization direction of the first magnetization pinned layer 12 is the same as that of the second magnetization pinned layer 13, so that when the magnetization of the magnetization free layer 10 is rotated to a specific direction by an external magnetic field, the electric resistances of the first and second tunnel junctions 18, 19 vary in the same fashion. In other words, when the magnetization of the magnetization free layer 10 is rotated to a direction parallel to the magnetization directions of the magnetization pinned layers 12, 13 but in the opposite direction, the electric resistance of the first tunnel junction 18 becomes large and the electric resistance of the second tunnel junction 19 becomes also large. On the other hand, when the magnetization of the magnetization free layer 10 is rotated in a direction parallel to the magnetization directions of the magnetization pinned layers 12, 13, the electric resistances of the first and second tunnel junctions 18, 19 become both small. In accordance with the present invention, since the two tunnel junctions are formed in series, a variation in the overall electric resistance is about twice a variation in the electric resistance of each tunnel junction. Thus, there can be manufactured a tunnel junction MR head which produces a large reproduced output. This is one of the effects of the present invention. Although the anti-ferromagnetic layers 122, 132 are formed on the ferromagnetic layers 121, 131 in order to fix the magnetization direction of the magnetization pinned layers 12, 13 in this embodiment, any magnetization pinned layer may be used in the magnetic head of the present invention, so long as the magnetization pinned layer has a fixed magnetization direction. Magnetization pinned layers meeting such conditions as mentioned above include a permanent magnetic film having a high coercive force such as a Co—Cr—Pt alloy. When such a permanent magnetic film is employed as the magnetization pinned layer, however, the permanent magnetic film cannot be used as the bias layer. The reason is that such a permanent magnetic film cannot be magnetized, because the magnetization directions of the bias film and magnetization pinned layer must be substantially perpendicular to each other. Accordingly, when the permanent magnetic film is used as the magnetization pinned layer, it becomes necessary for the bias layer to comprise a laminate of ferromagnetic and anti-ferromagnetic layers.

Figure 5:
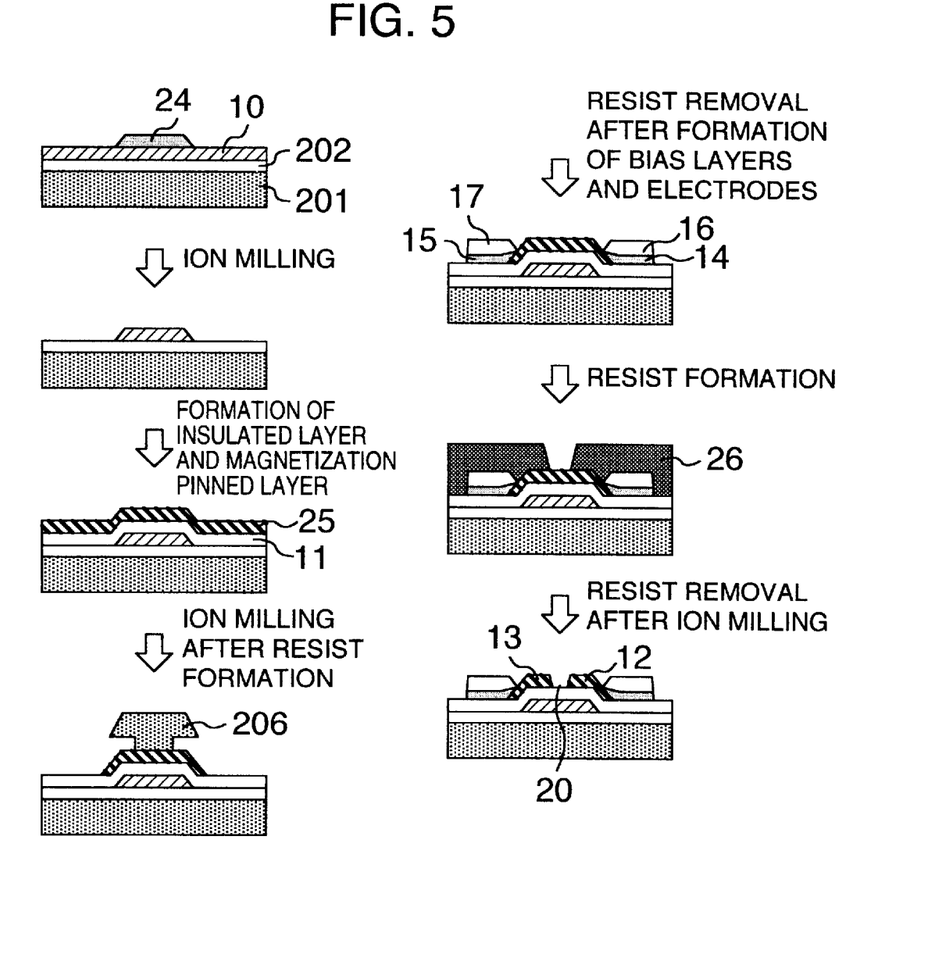
FIG. 5 shows how to manufacture a tunnel MR head of the present invention.

Now, let's explain how the tunnel junction MR head will be manufactured. FIG. 5 shows a method for manufacturing a tunnel junction MR head having a magnetization free layer provided above a magnetization pinned layer. The lower insulated layer 202 is formed on the lower magnetic shield 201. The lower magnetic shield 201 is a soft magnetic film of Ni—Fe alloy, Sendust or the like, and has a thickness of about 2 $\mu$m. The insulated layer 202 which is made of oxide such as alumina insulates an MR element from the magnetic shield side and defines a magnetic gap of the MR head together with the upper insulated film. An interval between the upper and lower magnetic shields determines the resolution of the magnetic head. The shortest wavelength of a signal corresponds nearly to the length of the gap. Accordingly, the thickness of the insulated layer 202 corresponds to about ½ of the shortest read wavelength. Formed on the insulated layer 202 is a magnetization free layer 10 of an Ni—Fe alloy having excellent soft magnetic characteristics and containing about 80% of Ni. The magnetization free layer 10 has a thickness of about 50 angstroms. The magnetization free layer 10 is processed to have a predetermined shape, by forming a photo-resist 24 on the magnetization free layer 10 and etching the laminate with use of the photo-resist as a mask by an ion milling process or the like. In the magnetic head of the present invention, since the signal detection is carried out by the magnetization free layer 10 being rotated by an external magnetic field (which is the magnetic field from a magnetic medium), the width of the magnetization free layer 10 in a track direction is the width for detecting the signal from the magnetic medium, that is, a read track width.

In general, when a thin film is processed by the ion milling process or the like, the processing accuracy is increased as the film thickness decreases. With this structure, since the track width is determined by the very thin magnetization free layer, the dimensional accuracy in the track direction is increased. Next a metallic film of aluminum having a thickness of 1–2 nm is formed on the patterned magnetization free layer 10. When the aluminum film is spontaneously oxidized in the atmosphere, an alumina film is formed as the insulated layer 11 in order to form a tunnel junction. It is preferable that the thickness of the insulated layer be smaller, because it results in that the magnitude of a tunnel resistance becomes smaller, for which end it is required that there is no pinhole in the entire front face of the tunnel junction. For this reason, it is difficult to make the insulated layer thinner. Further, a magnetization pinned layer 25 is formed on the insulated layer 11. The magnetization pinned layer 25 is depicted as a single layer in the illustrated example, but the magnetization pinned layer 25 may be a laminate of ferromagnetic and anti-ferromagnetic films or a signal permanent magnetic film. In the case of the laminate of ferromagnetic and anti-ferromagnetic layers, Co is desirable for the ferromagnetic film. This is because it is known that the use of Co causes a large resistance change. Further, the magnetization pinned layer 25 has a thickness of preferably about 3–5 nm. The magnetization direction of the magnetization pinned layer 25 is pinned or fixed by exchange coupling with the anti-ferromagnetic layer, so that when the film thickness is large, the magnitude of the exchange coupling field with the anti-ferromagnetic layer becomes small, and thus the magnetization pinned layer is rotated by the external magnetic field. To avoid this, it is necessary for the magnetization pinned layer to have such a thickness as to generate a sufficiently large exchange coupling field. As the material of the anti-ferromagnetic layer for fixing of the magnetization direction of the magnetization pinned layer, any known material may be employed so long as the material can produce a large exchange coupling field and can have a high blocking temperature (temperature at which the exchange coupling disappears). The anti-ferromagnetic layer is made of preferably a Cr—Mn—Pt alloy having a composition of (Cr45Mn45Pt10). The composition alloy has a large exchange coupling field, a high heat resistance and a high corrosion resistance. The anti-ferromagnetic layer has a thickness of preferably 25 nm. In order to achieving the exchange coupling between the anti-ferromagnetic layer and the magnetization pinned layer to orient the magnetization direction of the magnetization pinned layer in a preferred direction, it is necessary to subject the magnetization pinned layer to a heat treatment at a suitable temperature while a magnetic field is applied to the preferred magnetization direction of the magnetization pinned layer. When the anti-ferromagnetic layer is made of the Cr—Mn—Pt alloy, the preferred heat treatment temperature is 230° C. When the layer is kept at the temperature of 230° C. for about 3 hours and then cooled to the room temperature while the magnetic field is applied thereto, which results in that the magnetization direction of the magnetization pinned layer is fixed substantially to the magnetization application direction. The preferable magnetization direction of the magnetization pinned layer 25 is a direction perpendicular to the magnetization direction of the magnetization free layer 10, that is, in a paper-sheet depth direction. When the anti-ferromagnetic layer such as an Fe—Mn film having a blocking temperature lower than that of the Cr—Mn—Pt film, its heat treatment temperature may be much lower than that of the Cr—Mn—Pt film. Since the blocking temperature of the Fe—Mn film is about 150° C., its heat treatment temperature is allowed to be higher than the blocking temperature, e.g., about 180° C. A photo-resist film 206 is further formed on the magnetization pinned layer 25, and then the magnetization pinned layer 25 is etched with this photo-resist film 206 used as a mask. Without the photo-resist film 206 removed, the bias layers 14, 15 and the electrode films 16, 17 are formed. When the magnetization pinned layer 25 comprises the laminate of the ferromagnetic and anti-ferromagnetic layers, the bias layers 14, 15 can be made of permanent magnetic material such as a Co—Cr—Pt film. The thickness of the Co—Cr—Pt film is determined so that a product of the thickness of the Co—Cr—Pt film and the remanence is about twice the saturation magnetization of the magnetization free layer 10. When the thickness is set in this way, the magnetization free layer 10 becomes a single magnetic domain and operates linearly to the medium magnetic field. When the magnetization pinned layer 25 is made of permanent magnetic material, however, the bias layers 14, 15 cannot be made of the permanent magnetic material. This is because the magnetization pinned layer 25 and the bias layers 14, 15 are different in their magnetizing directions.

For this reason, when the magnetization pinned layer 25 is made of the permanent magnetic material, the bias layers 14, 15 are required to comprise the ferromagnetic and anti-ferromagnetic layers in order to fix the magnetization directions of the bias layers 14, 15 to the track-direction. This method is substantially the same as the above case in which the magnetization pinned layer 25 is made up of the two ferromagnetic and anti-ferromagnetic layers. The ferromagnetic layer fixedly magnetized in the track direction, like the permanent magnetic film, applies a bias magnetic field to the magnetization free layer 10. As the material of the electrode film, any material can be used so long as the material has a small electric resistance and has a less diffusion property. Desirably gold or Ta thin film is employed. A step of forming the bias layers 14, 15 and the electrode films 16, 17 is the same as a step of forming the bias layers and the electrode films in the prior art MR head. After the photo-resist film 206 is removed, a resist pattern 26 is formed thereon to provide a gap in the magnetization pinned layer 25. In this way, the gap 20 is formed in the magnetization pinned layer 25, so that the magnetization pinned layer 25 is divided into the first magnetization pinned layer 12 and the second magnetization pinned layer 13. At this stage, the element part in the magnetic head of the present invention has been completed. Thereafter, steps of forming an upper gap and an upper magnetic shield are present, but explanation thereon is omitted.

Figure 6:
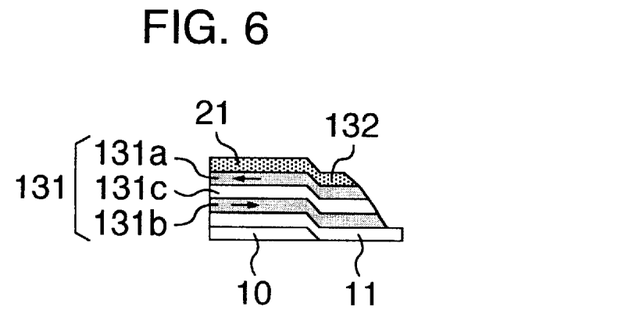
FIG. 6 shows a laminated structure of a tunnel junction MR head having a magnetization pinned layer made up of a plurality of ferromagnetic layers.

FIG. 6 shows a structure of a tunnel junction MR head of the present invention having a magnetization pinned layer 131 of laminated films. With this structure, the magnetization pinned layer 131 is made up of two ferromagnetic films 131a, 131b and a non-magnetic film 131c inserted therebetween as laminated. The preferred material of the ferromagnetic films is Co and the preferred material of the non-magnetic film is Ru. When the magnetization pinned layer 131 is made up of the laminated ferromagnetic films 131a, 131b and non-magnetic film 131c, it is known that the magnetization directions of the ferromagnetic films are made parallel to each other but in opposite directions by making the thickness of the non-magnetic film very small. This is because the ferromagnetic films mutually interact and the direction of the interaction varies with the thickness of the non-magnetic film. When the thickness of the non-magnetic film is controlled to have a suitable value, the magnetization directions of the ferromagnetic films 131a, 131b can be oriented substantially parallel to each other but in opposite directions as illustrated. When the magnetization pinned layer is made up of a plurality of films and the magnetization directions of the films are set parallel to each other but in opposite directions in this way, there are advantages which follow. First, it can be prevented that a magnetic field from the magnetization pinned layer 131 causes the magnetization direction of the magnetization free layer 10 to be changed. Since the magnetization direction of the magnetization pinned layer 131 is fixed, the magnetic field is generated in the fixed direction and affects the magnetization free layer 10. On the other hand, when the magnetization pinned layer 131 includes the laminated ferromagnetic films 131a, 131b, since the magnetization of the ferromagnetic films 131a, 131b are cancelled each other, the generated magnetic field can be made highly small and it can be prevented that the magnetization direction of the magnetization free layer 10 be changed by the magnetization direction of the magnetization pinned layer 131. When a distance (MR height) from an element flying surface is made small in order to improve the sensitivity of the magnetic head, the magnetic field generated by the magnetization pinned layer 131 becomes large. Therefore, the magnetization direction of the magnetization free layer 10 tends to easily vary. However, the use of the magnetization pinned layer 131 of such laminated films enables prevention of such magnetization direction change. A second advantage is that a fixing force of the magnetization pinned layer 131 is increased. It is desirable in the tunnel junction MR head that the magnetization direction of the magnetization pinned layer 131 is not rotated at all by an external magnetic field. This is because a signal output is changed by an angle made by the magnetization directions of the magnetization free layer 10 and magnetization pinned layer 131, so that a change in the magnetization of the magnetization pinned layer 131 caused by the external magnetic field causes a decrease of a reproduced voltage. The formation of the magnetization pinned layer 131 with the laminated films causes the generation of strong anti-ferromagnetic coupling between the ferromagnetic layers, whereby the magnetization rotation less takes place. When the magnetization pinned layer 131 is made up of Co and Ru laminated films and the anti-ferromagnetic film is made of a Cr—Mn—Pt anti-ferromagnetic film having a composition of Cr40Mn40Pt10, for example, not less than 1 kOe of exchange coupling field is obtained. This value corresponds to about twice that when the magnetization pinned layer comprise a signal film. Such an increase in the exchange coupling field results from the fact that the magnetization direction of the ferromagnetic film is less moved by the anti-ferromagnetic interaction with the ferromagnetic layer. When the magnetization pinned layer 131 is made up of the laminated films, it is necessary to orient the magnetization direction of the magnetic layer 131b provided on the magnetization free layer side of the laminated films in a predetermined direction. To this end, the ferromagnetic film 131a provided on the opposite side of the magnetization free layer 10 of the magnetization pinned layer 131 is magnetized in a direction opposite to the desirable magnetization direction, whereby the magnetization direction of the ferromagnetic layer on the magnetization free layer side can be oriented in the desired direction. The ferromagnetic film 131a of the laminated films opposite to the magnetization free layer 10 is fixed by the anti-ferromagnetic film in this example, but the ferromagnetic film may be made of permanent magnetic material. In this connection however, when the bias layers are the permanent magnetic films, their magnetization directions become different and cannot be magnetized. In this case, therefore, it is necessary for the bias layer to be replaced by a laminate of anti-ferromagnetic and ferromagnetic films.

Figure 7A:
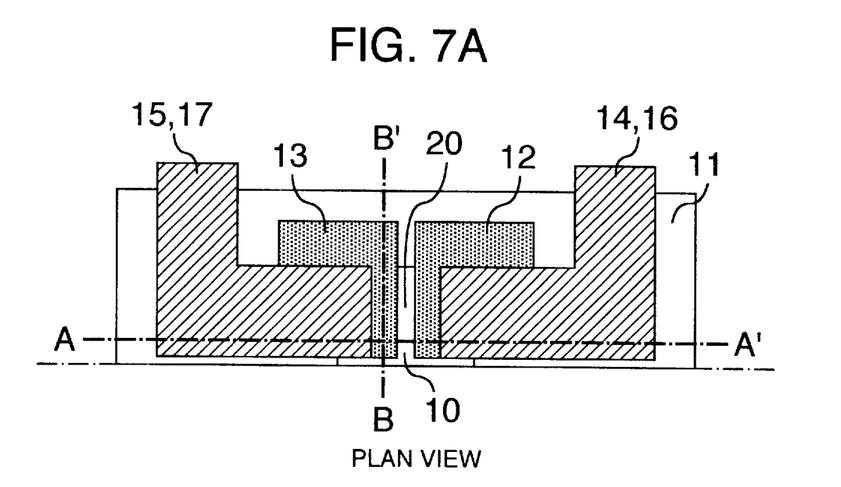
FIG. 7A is a plan view showing a structure of a second preferred tunnel junction MR head in accordance with the present invention.
Figure 7B:
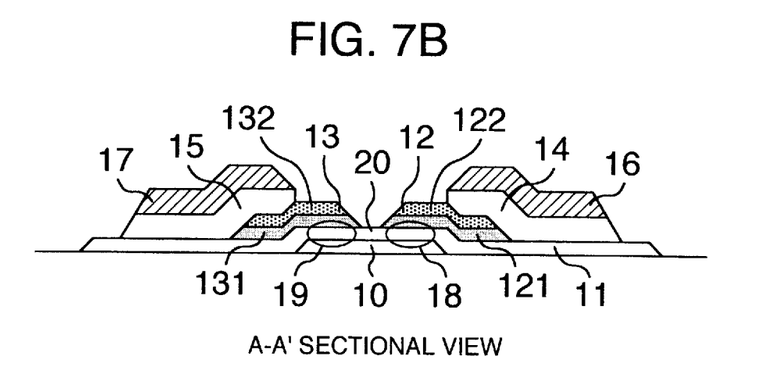
FIG. 7B is a cross-sectional view taken along line A–A' in FIG. 7A.
Figure 7C:
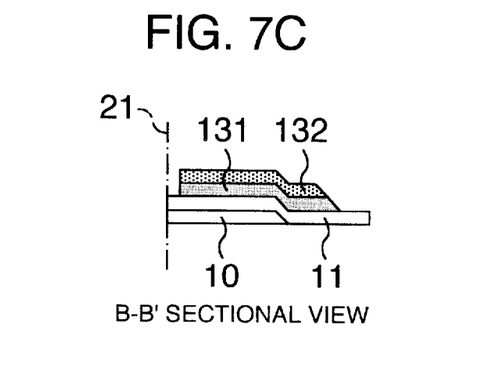
FIG. 7C is a cross-sectional view taken along line B–B' in FIG. 7A.

FIG. 7 shows a structure of a tunnel junction MR head in accordance with a second embodiment of the present invention. Similarly to FIG. 1, FIG. 7 shows a plan view, an A–A' sectional view and a B–B' sectional view. Since the tunnel junction MR head is constructed so that two adjacent ferromagnetic films with a very thin insulated film disposed therebetween, the electric short-circuiting easily takes place between the both films at the time of cutting a substrate into individual heads and processing the air bearing surface. The tunnel junction MR head of this embodiment is designed so that the electric short-circuiting less occurs between the magnetization free layer and the magnetization pinned layer. This head structure is substantially the same as the head structure of FIG. 1, except that the magnetization free layer 10 and the insulated layer 11 are more projected toward the air bearing surface than the magnetization pinned layers 12, 13 and are exposed to the air bearing surface. Such a structure can be easily manufactured by setting the magnetization pinned layers 12, 13 slightly inwards from the ends of the air bearing surface of the magnetization free layer 10 at the time of etching the magnetization pinned layers 12, 13. With this structure, only the magnetization free layer 10 is exposed to an air bearing surface 21, the problem of the electric short-circuiting between the magnetization pinned layers 12, 13 and the magnetization free layer 10 will not take place. However, the distance from the air bearing surface 21 to the magnetization pinned layers 12, 13 is too long, the sensitivity to the magnetic field from the medium is decreased. For this reason, it is necessary to minimize the distance length.

Figure 8:
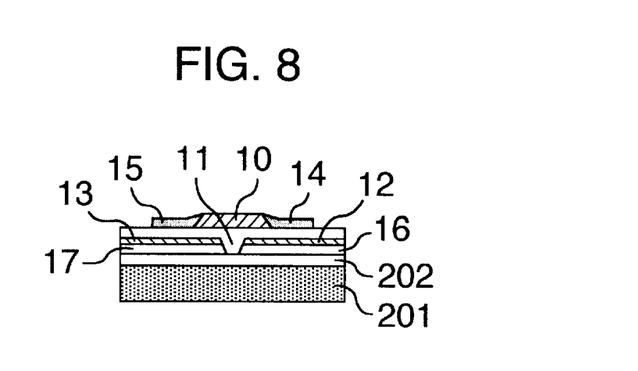
FIG. 8 shows a structure a tunnel junction MR head having a magnetization pinned layer provided below a magnetization free layer.

FIG. 8 shows a preferred structure of a tunnel junction MR head of the present invention wherein a magnetization free layer is provided above a magnetization pinned layer. In this structure, the insulated layer 202 is provided on the magnetic shield 201, on which the first and second electrode films 16, 17 and the first and second magnetization pinned layers 12, 13 are formed. Upper parts of the magnetization pinned layers 12, 13 are flattened, and the insulated layer 11 is formed on the flatten upper parts. The magnetization free layer 10 and the bias layers 14, 15 at both ends of the magnetization free layer 10 are formed on the insulated layer 11. The magnetization free layer 10 and the first and second magnetization pinned layers 12, 13 define the first and second tunnel junctions together with the insulated layer 11. A detection current flowing from the first electrode 16 is passed through the first tunnel junction to flow into the magnetization free layer 10, and further flows into the second electrode 17 through the second tunnel junction. In the case of the structure of FIG. 1, when the magnetization pinned layer is made up of two ferromagnetic and anti-ferromagnetic films, it is necessary to provide the ferromagnetic film below the anti-ferromagnetic film. This is because the ferromagnetic film of the magnetization pinned layer forms the magnetization free layer and the tunnel junction. In the case of the structure of FIG. 8, on the other hand, when the magnetization pinned layer is made up of two ferromagnetic and anti-ferromagnetic films, it is necessary to provide the ferromagnetic film above the anti-ferromagnetic film. Accordingly, even when the anti-ferromagnetic film is provided below the ferromagnetic film, a material producing an exchange coupling field is desirably used as the anti-ferromagnetic material. One of such materials is an Ni—Mn alloy film. The Ni—Mn alloy film is made of an ordered anti-ferromagnetic alloy, so that even when provided below the Ni—Fe alloy film, it can produce a large exchange coupling field by subjecting the Ni—Mn alloy film to a heat treatment for a long time. When the Ni—Mn film is used, the heat treatment of the Ni—Mn film is considered to cause the deterioration of its film characteristics, which means that it is difficult to use the Ni—Mn film as such an upper anti-ferromagnetic film as shown in FIG. 1. In the case of the illustrated structure, however, the problem of the deterioration of the film characteristics can be avoided by subjecting the Ni—Mn film to the heat treatment at the time point of having formed the magnetization pinned layer. Such a structure is not similar to that of the prior art MR head, but it can be manufactured by utilizing the prior art technique for the MR head in a similar way to the head having the structure of FIG. 1. Such a structure becomes possible because the two tunnel junctions as one of the features of the present invention are provided in series, and thus the electrodes can be formed in the same plane.

In accordance with the present invention, since two of the tunnel junctions are provided, two electrodes connected to the tunnel junction MR element are arranged in the same plane. Further, in the preferred structure of the present invention, the magnetization free layer is also provided in substantially the same plane, and thus the structure becomes close to the structure of the prior art MR head. Furthermore, when the magnetization free layer is provided in the lower part of the head, the magnetization free layer can be formed in the same plane as the electrodes. In addition, since the bias layers for applying the magnetic field to the magnetization free layer are provided at the ends of the magnetization free layer and the need for isolating the bias layers from the electrodes can be eliminated, the bias layers can be formed as laminated with the electrodes. This is also very similar to the prior art manufacturing method.

In accordance with the present invention, the tunnel junction MR head can be manufactured by the process similar to that of the prior art MR head. In the present invention, further, since the read track width is determined by the width of the very thin magnetization free layer, the track width can be determined with a high accuracy.

Further, when the sides of the air bearing surface of the magnetization free layer are extended toward the magnetic medium side from a straight line connecting the ends of the magnetization pinned layer on the magnetization free layer side as in the present invention, it can be avoided that the magnetization free layer and the magnetization pinned layer are exposed to the air bearing surface, whereby the electric short-circuiting therebetween can be prevented, and thus a highly reliable magnetic head can be provided.

Furthermore, in the tunnel junction MR head of the present invention, since two of the tunnel junctions are connected in series, a reproduced voltage becomes twice that in the case of a single junction, and thus the magnetoresistive head can generate a high output suitable for high density recording.

What is claimed is:

1. A magnetic tunnel junction magnetoresistive head comprising:

a magnetization free layer formed on a substrate, a magnetization direction of said magnetization free layer being rotatable by an external magnetic field;

an insulated layer formed over said magnetization free layer;

a first tunnel junction including a first magnetization pinned layer formed on a surface of said insulated layer at one end of said magnetization free layer, a magnetization direction of said first magnetization pinned layer being fixed; and said insulated layer isolating said magnetization free layer from said first magnetization pinned layer, and forming a tunnel junction between said magnetization free layer and said first magnetization pinned layer; and forming a tunnel junction between said magnetization free layer and said first magnetization pinned layer;

a second tunnel junction including a second magnetization pinned layer formed on said surface of said insulated layer at another end of said magnetization free layer opposed to said one end of said magnetization free layer, a magnetization direction of said second magnetization pinned layer being fixed; and said insulated layer isolating said magnetization free layer from said second magnetization pinned layer, and forming a tunnel junction between said magnetization free layer and said second magnetization pinned layer;

a first electrode electrically connected to said first magnetization pinned layer and electrically connected to said first tunnel junction;

a second electrode electrically connected to said second magnetization pinned layer and electrically connected to said second tunnel junction; and a bias layer provided at both ends of said magnetization free layer, and for applying a bias magnetic field to said magnetization free layer, wherein said first and second tunnel junctions are connected in series by said magnetization free layer, and a detection current flowing from said first electrode is passed through said first and second tunnel junctions.

2. A magnetic tunnel junction magnetoresistive head as set forth in claim 1, wherein means for fixing magnetization of said first or second magnetization pinned layer is a magnetic exchange coupling between an anti-ferromagnetic film and said first or second magnetization pinned layer, said anti-ferromagnetic film being closely contacted with said first or second magnetization pinned layer.

3. A magnetic tunnel junction magnetoresistive head as set forth in claim 1, wherein said first or second magnetization pinned layer is made up of a plurality of ferromagnetic films divided by at least one non-magnetic film, magnetization directions of said plurality of ferromagnetic films are oriented parallel to each other but in opposite directions, and the magnetization direction of one of said plurality of ferromagnetic films closest to said magnetization free layer is fixed.

4. A magnetic tunnel junction magnetoresistive head as set forth in claim 1, wherein a width of said magnetization free layer in a track direction corresponds substantially to a read width of the magnetic head.

5. A magnetic tunnel junction magnetoresistive head as set forth in claim 1, wherein sides of said magnetization free layer opposed to a magnetic medium are projected toward a magnetic medium side from a straight line obtained by connecting an end of said first magnetization pinned layer and an end of said second magnetization pinned layer on a magnetization free layer side.

6. A magnetic tunnel junction magnetoresistive head comprising:

a magnetization free layer formed on a substrate;

an insulated layer formed over said magnetization free layer;

a first tunnel junction formed between said magnetization free layer and a first magnetization pinned layer formed on a surface of said insulated layer; and a second tunnel junction formed between said magnetization free layer and a second magnetization pinned layer formed on said surface of said insulated layer, wherein said first and second tunnel junctions are provided at first and second ends of said magnetization free layer to be connected through said magnetization free layer, respectively, said first end of said magnetization free layer being opposed to said second end of said magnetization free layer; and a detection current flowing from a first electrode connected to said first tunnel junction through a first anti-ferromagnetic layer and a first bias layer is passed to a second electrode through said first bias layer, said first anti-ferromagnetic layer, said first tunnel junction, said magnetization free layer, said second tunnel junction, a second anti-ferromagnetic layer and a second bias layer.

7. A magnetic tunnel junction magnetoresistive head as set forth in claim 6, wherein means for fixing magnetization of said first or second magnetization pinned layer is a magnetic exchange coupling between an anti-ferromagnetic film and said first or second magnetization pinned layer, said anti-ferromagnetic film being closely contacted with said first or second magnetization pinned layer.

8. A magnetic tunnel junction magnetoresistive head as set forth in claim 6, wherein said first or second magnetization pinned layer is made up of a plurality of ferromagnetic films divided by at least one non-magnetic film, magnetization directions of said plurality of ferromagnetic films are oriented parallel to each other but in opposite directions, and the magnetization direction of one of said plurality of ferromagnetic films closest to said magnetization free layer is fixed.

9. A magnetic tunnel junction magnetoresistive head as set forth in claim 6, wherein a width of said magnetization free layer in a track direction corresponds substantially to a read width of the magnetic head.

10. A magnetic tunnel junction magnetoresistive head as set forth in claim 6, wherein sides of said magnetization free layer opposed to a magnetic medium are projected toward a magnetic medium side from a straight line obtained by connecting an end of said first magnetization pinned layer and an end of said second magnetization pinned layer on a magnetization free layer side.

11. A recording/reproducing composite magnetic head comprising:

a recording magnetic head having a recording magnetic core, a coil formed so as to be put between both ends of said recording magnetic core, and a first insulated layer for insulating said coil; and a reproducing head formed between an upper magnetic shield and a lower magnetic shield for converting a magnetic signal to an electric signal utilizing a magnetic tunnel junction magnetoresistive effect, wherein a tunnel junction magnetoresistive effect head comprises:

a magnetization free layer formed on a substrate, a magnetization direction of said magnetization free layer being rotatable by an external magnetic field;

a second insulated layer formed over said magnetization free layer;

a first tunnel junction including a first magnetization pinned layer formed on a surface of said second insulated layer at one end of said magnetization free layer, a magnetization direction of said first magnetization pinned layer being fixed; and said second insulated layer isolating said magnetization free layer from said first magnetization pinned layer, and forming a tunnel junction between said magnetization free layer and said first magnetization pinned layer;

a second tunnel junction including a second magnetization pinned layer formed on the surface of said second insulated layer at another end of said magnetization free layer opposed to said one end of said magnetization free layer, a magnetization direction of said second magnetization pinned layer being fixed; and said second insulated layer isolating said magnetization free layer from said second magnetization pinned layer, and forming a tunnel junction between said magnetization free layer and said second magnetization pinned layer;

a first electrode electrically connected to said first magnetization pinned layer and electrically connected to said first tunnel junction;

a second electrode electrically connected to said second magnetization pinned layer and electrically connected with said second tunnel junction; and a bias layer provided at both ends of said magnetization free layer, and for applying a bias magnetic field to said magnetization free layer, wherein said first and second tunnel junctions are connected in series by said magnetization free layer; and a detection current flowing from said first electrode is passed through said first and second tunnel junctions.

12. A recording/reproducing composite magnetic head as set forth in claim 11, wherein means for fixing magnetization of said first or second magnetization pinned layer is a magnetic exchange coupling between an anti-ferromagnetic film and said first or second magnetization pinned layer, said anti-ferromagnetic film being closely contacted with said magnetization pinned layer.

13. A recording/reproducing composite magnetic head as set forth in claim 11, wherein said first or second magnetization pinned layer is made up of a plurality of ferromagnetic films divided by at least one non-magnetic film, magnetization directions of said plurality of ferromagnetic films are oriented parallel to each other but in opposite directions, and the magnetization direction of one of said plurality of ferromagnetic films closest to said magnetization free layer is fixed.

14. A recording/reproducing composite magnetic head as set forth in claim 11, wherein a width of said magnetization free layer in a track direction corresponds substantially to a read width of the magnetic head.

15. A recording/reproducing composite magnetic head as set forth in claim 11, wherein sides of said magnetization free layer opposed to a magnetic medium are projected toward a magnetic medium side from a straight line obtained by connecting an end of said first magnetization pinned layer and an end of said second magnetization pinned layer on a magnetization free layer side.

* * * * *